United States Patent
Schuit et al.

(10) Patent No.: US 9,145,906 B2
(45) Date of Patent: Sep. 29, 2015

(54) SLIDE-ON STRUCTURAL POSITIONER

(71) Applicant: UNIRAC, INC., Albuquerque, NM (US)

(72) Inventors: Nathan Schuit, Edgewood, NM (US); Darren Womacks, Albuquerque, NM (US)

(73) Assignee: Unitrac, Inc., Albuquerque, NM (US)

( * ) Notice: Subject to any disclaimer, the term of this patent is extended or adjusted under 35 U.S.C. 154(b) by 378 days.

(21) Appl. No.: 13/653,020

(22) Filed: Oct. 16, 2012

(65) Prior Publication Data

US 2014/0101940 A1    Apr. 17, 2014

(51) Int. Cl.
F16B 7/04    (2006.01)
F24J 2/52    (2006.01)

(52) U.S. Cl.
CPC .............. F16B 7/0446 (2013.01); F24J 2/5245 (2013.01); Y10T 29/49623 (2015.01); Y10T 403/39 (2015.01)

(58) Field of Classification Search
CPC .... F16B 7/0446; F24J 2/5245; Y10T 403/39; Y10T 29/49623
See application file for complete search history.

(56) References Cited

U.S. PATENT DOCUMENTS

| | | | | |
|---|---|---|---|---|
| 3,456,970 | A * | 7/1969 | Sunasky | 403/319 |
| 4,157,641 | A * | 6/1979 | Hasselbacher | 52/656.9 |
| 5,237,785 | A * | 8/1993 | Lukes | 52/86 |
| 5,274,978 | A * | 1/1994 | Perkonigg et al. | 52/547 |
| 6,146,048 | A * | 11/2000 | Stibolt | 403/313 |
| 6,370,828 | B1 * | 4/2002 | Genschorek | 52/200 |
| 6,390,719 | B1 * | 5/2002 | Chan | 403/205 |
| 6,609,349 | B2 * | 8/2003 | Davidsaver | 52/771 |
| 6,837,016 | B2 * | 1/2005 | Simmons et al. | 52/655.1 |
| 7,260,918 | B2 | 8/2007 | Liebendorfer | |
| 7,434,362 | B2 | 10/2008 | Liebendorfer | |
| 7,600,349 | B2 | 10/2009 | Liebendorfer | |
| 8,894,424 | B2 * | 11/2014 | DuPont | 439/95 |
| 2003/0094603 | A1 | 5/2003 | Lerch, Jr. | |
| 2009/0232616 | A1 | 9/2009 | Sekreta | |
| 2010/0319277 | A1 | 12/2010 | Suarez et al. | |
| 2011/0107710 | A1 * | 5/2011 | Sias | 52/655.1 |
| 2013/0133270 | A1 * | 5/2013 | West et al. | 52/58 |

FOREIGN PATENT DOCUMENTS

WO    WO 2010/089469 A1    8/2010

OTHER PUBLICATIONS

International Search Report (PCT/ISA 220 & PCT/ISA/210) dated Mar. 10, 2014 (Four (4) pages).
Written Opinion (PCT/ISA/237) dated Mar. 10, 2014 (Five (5) pages).

* cited by examiner

*Primary Examiner* — Joshua J Michener
*Assistant Examiner* — Keith Minter
(74) *Attorney, Agent, or Firm* — Crowell & Moring LLP

(57) ABSTRACT

A positioner used to fasten a pair of structural members together includes side walls, lateral flanges extending from the side walls, and an interior web interconnecting the side walls. Each side wall is interconnected at vertices to one of the lateral flanges and to the interior web, and the interior web includes web sections interconnected at a vertex to each other. Each vertex interconnecting one of the side walls with the interior web terminates at a void extending between adjacent portions of the one of the side walls and the interior web, and the vertex interconnecting the web sections is displaced from the lateral flange surfaces so as to avoid contact with a positioner supporting surface. A support frame and a fastening process utilizing such a positioner are also discussed. The positioner is particularly suitable for use in constructing photovoltaic panel supports.

7 Claims, 5 Drawing Sheets

SLIDE-ON STRUCTURAL POSITIONER

BACKGROUND OF THE INVENTION

1. Field of the Invention

A positioner, a support frame, and a fastening process according to this invention are particularly suitable for use in constructing photovoltaic panel supports.

2. Description of Related Art

U.S. Pat. No. 7,260,918 to Liebendorfer discloses a system for removably and adjustably mounting photovoltaic modules on an object using rails with multiple tracks.

U.S. Patent Application Publication 2010/0319277 to Suarez et al. discloses a modular structural framing system including variously configured brackets and clamps.

U.S. Pat. No. 7,434,362 to Liebendorfer, U.S. Pat. No. 7,600,349, also to Liebendorfer, and U.S. Patent Application Publication 2009/0232616 to Sekreta et al. may also be of interest.

The disclosures of the Liebendorfer ('918) patent and the Suarez et al. ('277) publication are incorporated herein by reference in their entireties as non-essential subject matter.

SUMMARY OF THE INVENTION

According to one aspect of the invention, a particularly configured positioner used to fasten a pair of structural members together includes side walls, lateral flanges extending from the side walls, and an interior web interconnecting the side walls. The lateral flanges include surfaces for contacting a positioner supporting surface on one of the structural members. Each side wall is interconnected at vertices to one of the lateral flanges and to the interior web, and the interior web includes web sections interconnected at a vertex to each other. Each vertex that interconnects one of the side walls with the interior web terminates at a void extending between adjacent portions of that one of the side walls and the interior web, and the vertex interconnecting the web sections is displaced from the lateral flange surfaces so as to avoid contact with the positioner supporting surface.

The positioner side walls are preferably substantially parallel, the lateral flange surfaces are substantially co-planar, and, overall, the positioner is configured to approximate an M-shape or a W-shape as seen from one end. In one particular arrangement, the void referred to is formed by a slot extending parallel to a slot extending between adjacent portions of the other off the side walls and the interior web. To facilitate production, the side walls, the lateral flanges, and the interior web may all be formed of a single sheet metal piece, if desired. In one particularly suitable application of the invention, the structural members form a photovoltaic panel support.

Another aspect of the invention concerns a support frame mountable on a plurality of hollow columns. The support frame includes a rail member and at least one positioner as mentioned above that is secured to the rail member. The vertex that interconnects the web sections is displaced from a web or wall of the rail member to permit reception of a wall of one of the hollow columns between that vertex and the web or wall of the rail member. The slot mentioned extends along a slot axis, and the rail member of the support frame extends along a longitudinal axis oriented at a preselected angle relative to the slot axis. Each slot is dimensioned to receive a wall of one of the hollow columns, and the vertex and the web or wall of the rail member are displaced by such a distance that the vertex engages the hollow column wall.

The invention also concerns a process of fastening first and second structural members together using a positioner. Such a process includes attaching the lateral flanges of the positioner to a web or wall of the first structural member, sliding the second structural member into voids defined in the positioner until abutments defined by the positioner engage side wall edges of the second structural member, and adjusting relative alignment of the first and second structural members axially, rotationally, or axially and rotationally until the first and second structural members are in a desired relative position. Once the first and second structural members are in the desired relative position, the positioner is attached to second structural member to secure the first and second structural members in the desired position.

It is contemplated that adjusting the relative alignment of the structural members will include displacing the first member along a longitudinal axis of the second structural member, and that contact between a vertex defined by a web of the positioner and a wall surface of the second structural member will be maintained while sliding the second structural member into the voids. These voids, again, are defined by substantially parallel slots in the particular arrangement shown and described. Finally, when sliding the second structural member into the voids as referred to, first structural member is displaced along a longitudinal axis of the second structural member.

Other features of the invention will be apparent from the description that follows.

DETAILED DESCRIPTION OF THE INVENTION

Figure 1:
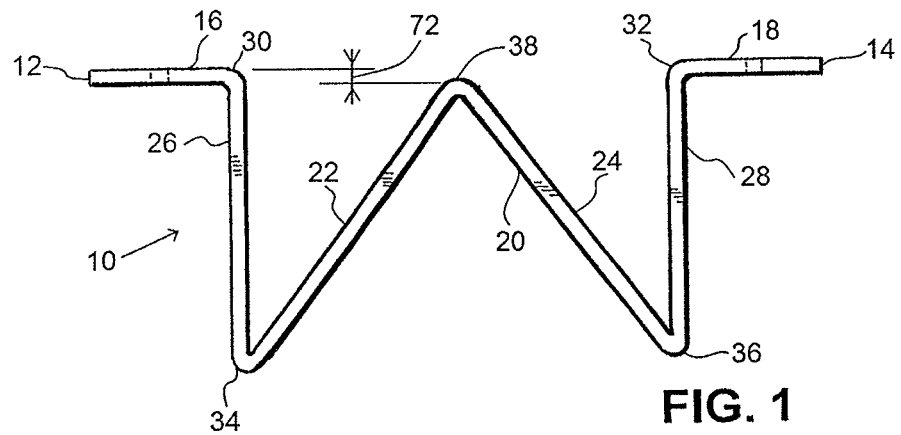
FIG. 1 is an end view of a structural positioner according to one embodiment of the invention.

FIG. 1 provides an end view of a structural positioner 10 used to fasten together a pair of structural members, such as a rail member and an upright hollow column, according to one embodiment of the invention. The positioner 10 preferably has a unitary, single piece configuration, and may be formed of stamped sheet metal or of any other material having suitable strength and rigidity to provide requisite support. Positioner 10 includes a mounting portion, including a pair of outwardly extending lateral flanges 12, 14 with substantially co-planar "front" surfaces 16, 18, a positioning portion defined by an angled interior connecting web 20, including web sections 22 and 24, and substantially parallel side walls 26 and 28. The side wall 26, as shown, interconnects the lateral flange 12 and the web section 22, while the side wall 28 interconnects the lateral flange 14 and the web section 24. The lateral flange 12 and the side wall 26 are joined together at a bend, junction, corner, or vertex 30, the lateral flange 14 and the side wall 28 are joined together at a bend, junction, corner, or vertex 32, the web section 22 and the side wall 26 are joined together at a bend, junction, corner, or vertex 34, the web section 24 and the side wall 28 are joined together at a bend, junction, corner, or vertex 36, and the two web sections 22 and 24 are joined together at a bend, junction, corner, or vertex 38. Overall, the positioner 10 defies an approximately "M-" or "W-" shaped element as seen in the view provided by FIG. 1. Each bend, junction, corner, or vertex mentioned will be referred to in the remainder of this text as a "vertex" for simplicity.

Figure 2:
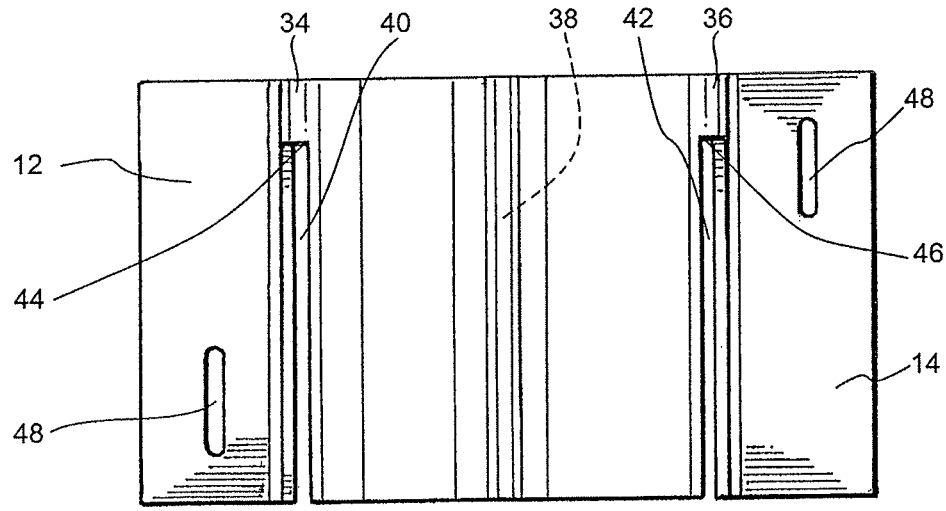
FIG. 2 is a view from below the structural positioner illustrated in FIG. 1.
Figure 3:
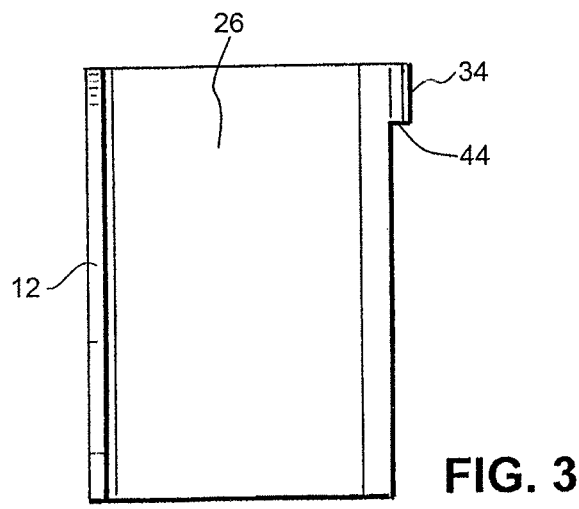
FIG. 3 is a view of the structural positioner shown in FIG. 2 from one side.

FIG. 2 is a view of the structural positioner 10 from below the positioner as illustrated in FIG. 1, while FIG. 3 is a view of the left side of the positioner 10 shown in FIG. 2. As FIG. 2 shows, the vertex 34 terminates at a slot, notch, or other type of void 40 defined between adjacent portions of the side wall 26 and the section 22 of the web 20 to form an abutment 44 to be described. Similarly, the vertex 36 terminates at a slot, notch, or other type of void 42 defined between adjacent portions of the side wall 28 and the section 24 of the web 20 to form an abutment 46. The vertices 30, 32, and 38, however, extend over the entire width of the positioner 10, as is apparent from FIGS. 2-5 and 7-8. The lateral flanges 12 and 14 may be provided with optional positioning slots 48 to facilitate location of the positioner 10 on and/or attachment of the positioner 10 to an appropriate rail member or other structure in a manner to be described.

Figure 4:
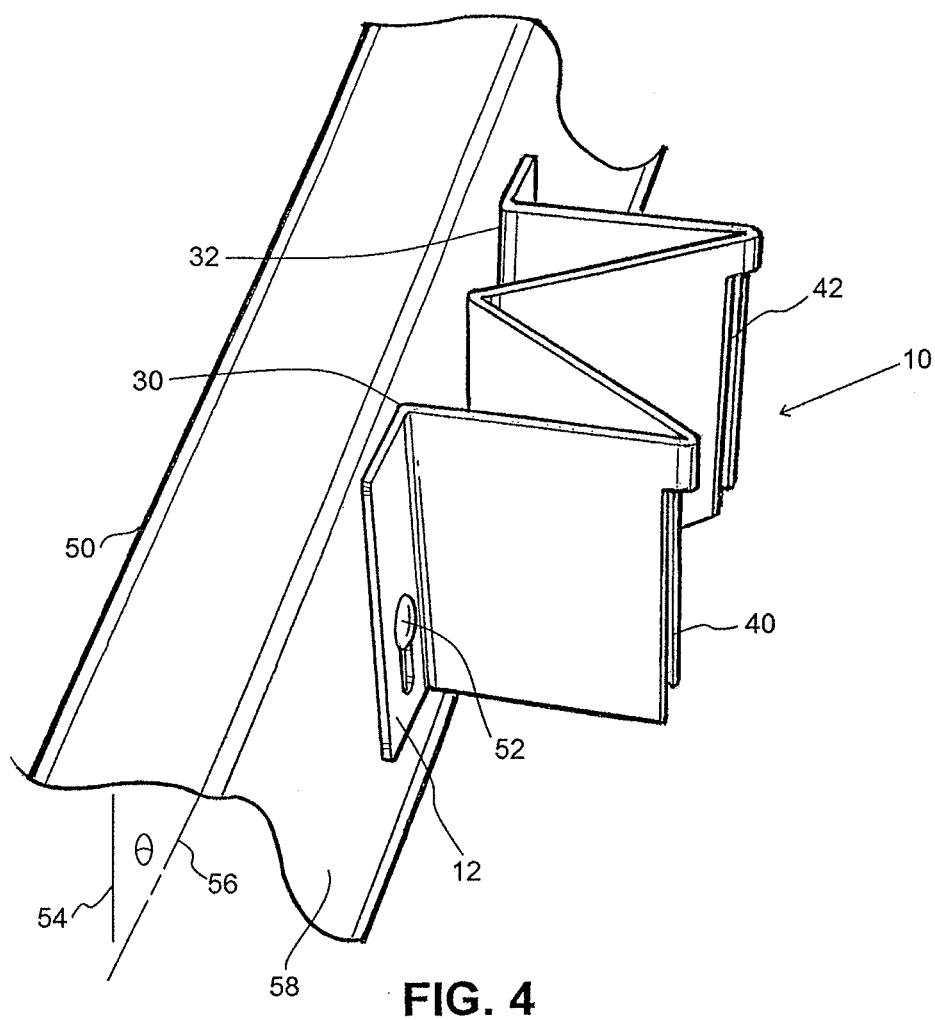
FIG. 4 illustrates the structural positioner shown in FIGS. 1-3 when it is attached to a rail member.

FIG. 4 illustrates a positioner 10 according to the invention attached to a rail member 50. In one suitable application of the invention, the rail member 50, which could be upwards of 35 feet long, will be utilized as a support for a photovoltaic panel or a series of photovoltaic panels to eventually be secured in place on the rail member 50. FIG. 4 shows a rivet, bolt, screw, or other such fastener 52 securely attaching the outwardly extending lateral flange 12 of the positioner to a web or wall 58 of the rail member 50. In one preferred arrangement, powder actuated nails are utilized as the fasteners. Other forms of attachment, such as cementing, gluing, or welding, could be employed as alternatives to or in conjunction with the fastener types mentioned. It will be understood, for example from FIGS. 6-7, that another fastener 52 is also supplied to secure the other outwardly extending lateral flange 14 to the web or wall 58 as well. To facilitate construction of an array of photovoltaic panels in a way to be described, the positioner 10 is secured to the rail member 50 so that, assuming voids 40 and 42 extend in a direction parallel to an axis 54, a longitudinal axis 56 of the rail member 50 is oriented at a particularly selected angle θ, such as 40° or more, for example, relative to that axis 54.

Figure 5:
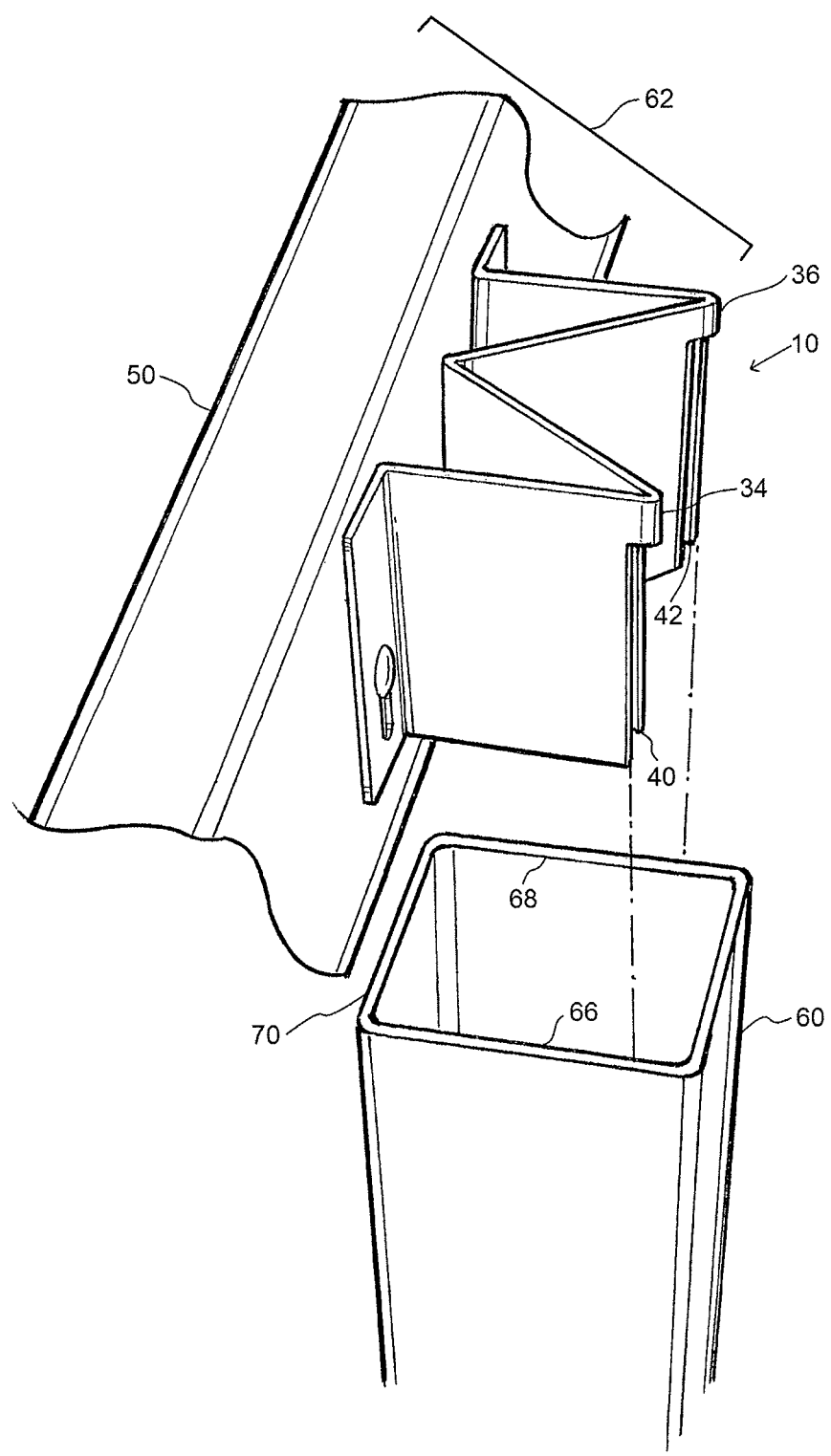
FIG. 5 shows a portion of a support frame, including the positioner and a rail member to which it is mounted, located above a hollow column onto which the support frame is to be mounted.

In one arrangement, the particular positioner 10 illustrated in FIGS. 1-3 is one of multiple essentially identical positioners secured to the rail member 50, each of which is to be used to secure a section of the rail member to a hollow post or column (hereafter "column" for simplicity) having an essentially square or rectangular cross section. FIG. 5 shows a portion of a support frame 62 according to such an arrangement, including one positioner 10 and part of a rail member 50, as located above a hollow column 60. In one particular arrangement contemplated, the column 60 is supported by or embedded in the ground, a building surface, or any other suitable support, and constitutes one of a plurality of such columns on which the overall support frame 62 is to be mounted.

Figure 6:
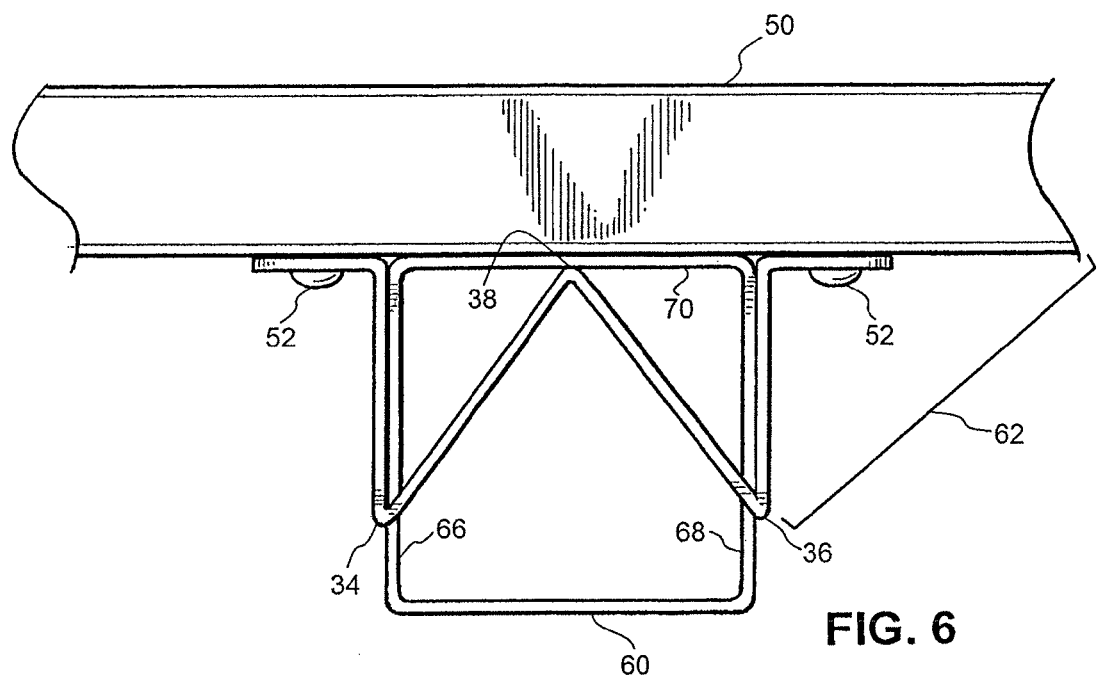
FIG. 6 is a view from above the support frame portion shown in FIG. 5 after it has been mounted onto the hollow column.
Figure 7:
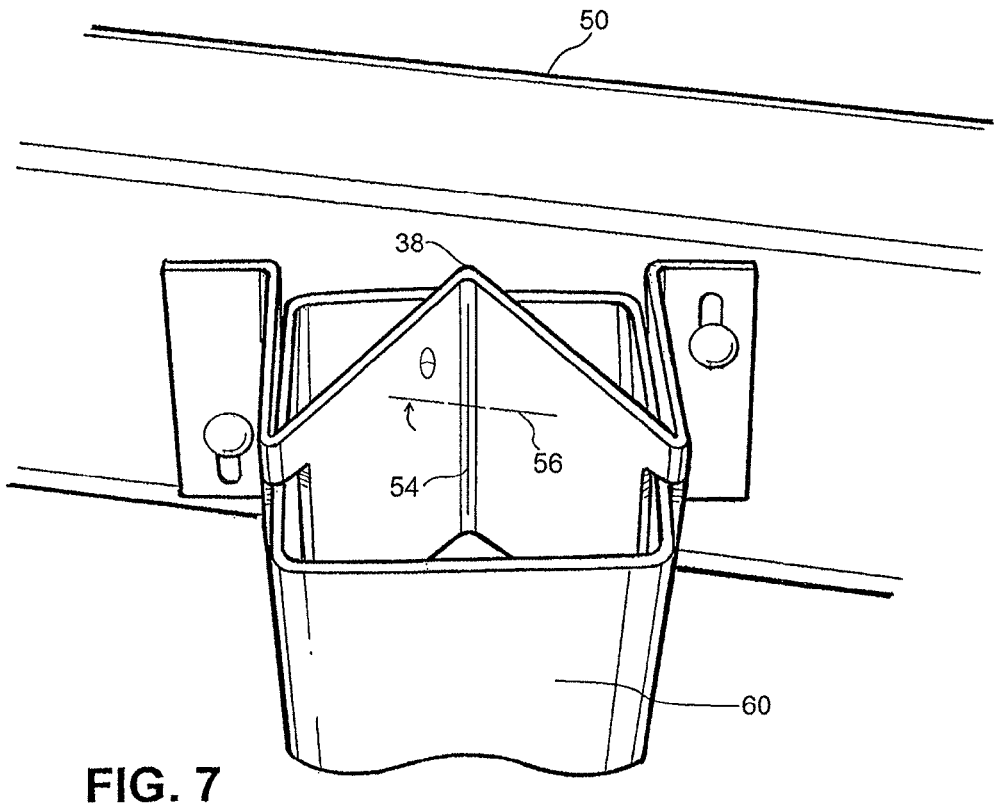
FIG. 7 is a perspective view from above an arrangement such as that shown in FIG. 6.

After securing the positioner 10 to the rail member 50 using the fasteners 52 or other forms of attachment in the manner described, to mount the support frame 62 to each column 60, the void 40 at which the vertex 34 terminates is aligned with a "side" wall 66 of the column 60, while the void 42 at which the vertex 36 terminates is aligned with an opposite "side" wall 68 of that same column 60 approximately parallel to the wall 66. Relative movement of the support frame 62 and the column 60 is provided so that upper edges of the walls 66 and 68 enter into and slide within the voids 40 and 42 until those wall edges contact the abutments 44 and 46 (FIG. 2). Once this contact occurs, the support frame 62 will be gravitationally maintained in the position illustrated in FIGS. 6-8 relative to the column 60. As best shown in FIG. 6, after the support frame 62 is placed in the manner described onto the columns 60, to assist in stabilizing the support frame relative to each column, the vertex 38 of each positioner 10 contacts a "rearwardly" facing interior surface of a "front" wall 70 extending transversely relative to the side walls 66 and 68 of the respective column. The particularly selected angle θ referred to above is automatically retained throughout and following completion of the process of mounting the support frame 62 to the columns, as is evident from FIG. 7. It will be recognized, of course, that the rail member 50 shown in FIG. 4 and the rail member 50 shown in FIG. 7 are on opposite lateral sides of the overall support frame 62, and the angles θ shown are illustrated accordingly. In FIGS. 4 and 7, the angle θ shown is an acute angle.

Figure 8:
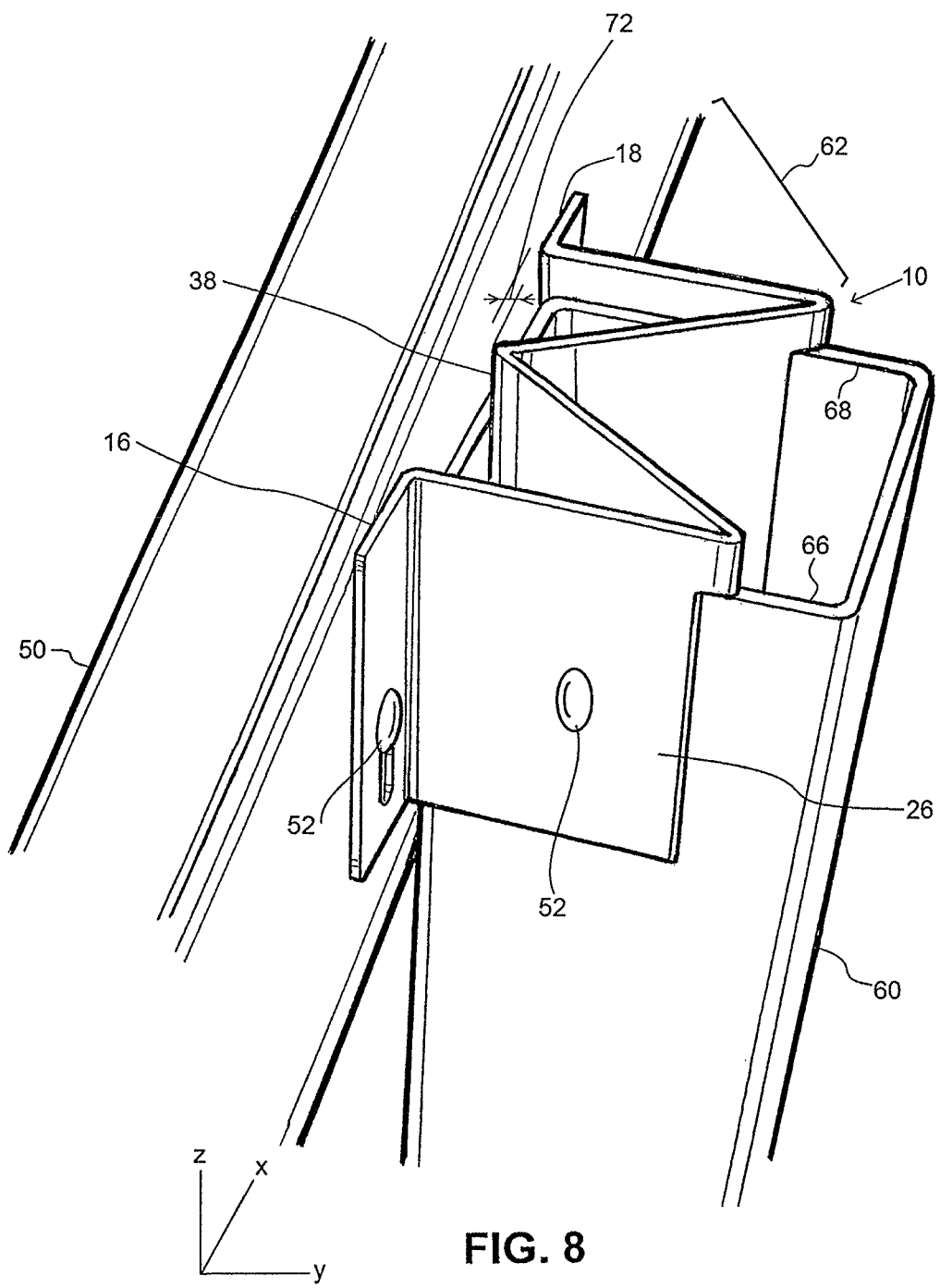
FIG. 8 is a perspective view of the support frame after it is fastened in place on the hollow column.

Referring now to FIG. 8, once the requisite number of support frame positioners 10 are placed on columns 60 in the manner described, gross positional adjustment of the support frame 62 relative to each column both in a z-axis direction (for example, a vertical direction) and rotationally can be made by moving the support frame so that the side walls 66 and 68 of any column can slide within the voids 40 and 42 of a respective positioner. Thus, by way of example only, if an overlap of 2 inches between the positioner 10 and the column 60 is required for satisfactory stability, and if the voids 40 and 42 extend for 5 inches, then adjustability in the z-axis direction over a 3 inch range is available. It will be recognized that displacing the support frame 62 relative to the column 60 in the z-axis direction provides movement of the frame 62 along the longitudinal axis of the column 60. Fine positional adjustment of the frame relative to the column in the x-axis and y-axis directions is available as well by way of modest deformation of the positioners 10 and/or play remaining between the positioners and the columns 60. As the rail member 50 and the positioners 10 are pre-assembled, the selected angle θ, again, is automatically retained throughout the process of mounting the support frame 62 to the columns, thereby providing a preselected approximately correct rotational orientation of the rail member 50 relative to every column 60.

Once the support frame 62 is properly positioned with respect to a column 60, the support frame may be securely fastened in place, for example by additional fasteners 52 that are used to securely attach the positioner side walls 26 and 28 to the column side walls 66 and 68. Vertex 38 may be displaced at a particularly selected distance 72 (see also FIG. 1) relative to the front lateral flange surfaces 16 and 18 so that contact between the vertex 38 and the rail member web or wall 58 is avoided. This distance is preferably equal to the wall thickness of the columns 60. In this way, after each positioner 10 is placed on a column 60, contact of the positioner vertex 38 with the rearwardly facing interior surface of the front column wall 70 will produce the stability mentioned previously.

The structural positioner 10 of the invention thus is best used to temporarily fasten together and align two structural members, such as the rail member 50 and the column 60, without the aid of additional clamping devices. The voids 40 and 42 of the positioner permit positioning a "horizontal" structural member, such as the rail member 50, at up to about 50° from horizontal atop a vertical column. The positioner 10 has a construction that prevents such a horizontal member from moving while final fastening of the overall support frame 62 to columns 60 is being performed, and, upon final fastening, the positioner 10 resists loads along all axes. Angular, vertical, and horizontal adjustments of the support frame 62 are permitted, while, at the same time, the support frame is adequately supported and restrained.

The slide-on positioner 10 described defines an adjustable, slip-on bracket connector, providing for placement of thereof upon a column 60 or other such structural member, with no initial fastening, fixing, or clamping required. A support frame including positioners such as those described allows for support frame placement and fixing by one person, as the support frame is self-supporting and self-aligning once it is placed on the support columns 60 or other such structural members. The positioner is designed to provide automatic approximate alignment in x-axis and y-axis directions, as well as rotational alignment, but to permit gross adjustment in a Z-axis direction and rotationally, as well as fine adjustments in the x-axis direction and the y-axis direction.

Through novel placement, the positioner minimizes pull-out loads on the fasteners, and places all critical fastening points in shear rather than bending or tension. The positioner can be made compatible with many fasteners, including but not limited to bolts, welds, direct fasteners, and rivets, and adhesives of many sorts.

The positioner 10 could be adapted to fit onto many different sized and shaped vertical columns, including columns with round, square, rectangular, w-shaped, and other cross sectional configurations, is especially suitable for use in solar photovoltaic racking installations, and has the potential to replace all current methods of fixing members in this sort of installation within the acceptable range of loads.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A positioner used to fasten a pair of structural members together, comprising:
   side walls,
   lateral flanges extending from the side walls, and
   an interior web interconnecting the side walls,
   wherein the lateral flanges include surfaces for contacting a positioner supporting surface on one of the structural members,
   wherein each side wall is interconnected at vertices to one of the lateral flanges and to the interior web,
   wherein the interior web includes web sections interconnected at a vertex to each other,
   wherein each vertex interconnecting one of the side walls with the interior web terminates at a void extending between adjacent portions of said one of the side walls and said interior web, and
   wherein the vertex interconnecting the web sections is displaced from the lateral flange surfaces so as to avoid contact with the positioner supporting surface.

2. The positioner of claim 1, wherein the side walls are substantially parallel.

3. The positioner of claim 1, wherein the lateral flange surfaces are substantially co-planar.

4. The positioner of claim 1, wherein the positioner is configured to approximate an M-shape or a W-shape as seen from one end.

5. The positioner of claim 1, wherein the void is formed by a slot extending parallel to a slot extending between adjacent portions of the other off the side walls and said interior web.

6. The positioner of claim 1, wherein the side walls, the lateral flanges, and the interior web are formed of a single sheet metal piece.

7. The positioner of claim 1, wherein the structural members form a photovoltaic panel support.

* * * * *